United States Patent [19]

Kane

[11] 4,178,108

[45] Dec. 11, 1979

[54] APPARATUS FOR SPACE SYNCHRONIZING CARRIER AND ROTATABLE PRINT DISK POSITIONS IN ON-THE-FLY PRINTING

[75] Inventor: Milburn H. Kane, Round Rock, Tex.

[73] Assignee: International Business Machines Corporation, Armonk, N.Y.

[21] Appl. No.: 918,998

[22] Filed: Jun. 26, 1978

[51] Int. Cl.² ............................................. B41J 1/26
[52] U.S. Cl. ............................. 400/144.2; 101/93.19; 400/74
[58] Field of Search ................... 400/74, 144.2, 144.3, 400/154.3, 154.4, 154.5, 155, 162.2, 163, 279, 320, 322, 323, 328; 101/93.19; 364/900 MS File

[56] References Cited

U.S. PATENT DOCUMENTS

| | | | |
|---|---|---|---|
| 3,356,199 | 12/1967 | Robinson | 400/144.3 |
| 3,461,235 | 8/1969 | Willcox | 400/144.2 |
| 3,707,214 | 12/1972 | Ponzano | 400/144.2 |
| 3,858,509 | 1/1975 | Grundherr | 400/144.3 |
| 4,027,764 | 6/1977 | Kashio | 400/74 |
| 4,030,591 | 6/1977 | Martin et al. | 400/144.2 X |
| 4,035,781 | 7/1977 | Chang | 364/900 |
| 4,044,880 | 8/1977 | Martin | 400/144.3 X |

Primary Examiner—Paul T. Sewell
Attorney, Agent, or Firm—J. B. Kraft

[57] ABSTRACT

A rotatable print disk is mounted on a carrier which traverses along the print line. The disk is moved from each character position to the next by the shortest distance at a constant velocity; thus, the time for the disk to move from a given character position to the next will be variable dependent on this distance. The carrier is moved from one print position to the next, a fixed distance, at a variable speed selected in order that carrier reach the next print position in synchronization with the disk reaching the next character position. Upon such synchronization, a print hammer is fired to print the character while the carriage continues on-the-fly towards the next print position. The apparatus includes means responsive to a synchronization failure for reversing the movement of the carrier towards the previous printing position while permitting the continued movement of the print disk to the next character position, and means for then reinitiating the forward movement of the carrier towards the next print position while retaining the print disk at said next character position until the arrival of the reinitiated carrier at the next print position.

11 Claims, 10 Drawing Figures

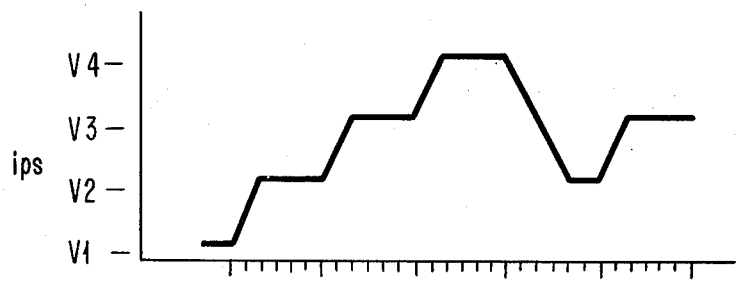
FIG. 4
1/60" PER. DIV.
VELOCITY DISPLACEMENT
PROFILE
FIG. 5
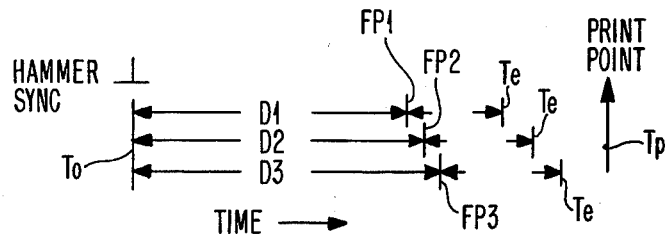
EXAMPLE OF DELAYS
FOR ONE VELOCITY
FIG. 6
DELAY TABLE
| CONDITION | DELAY TIME | HAMMER ENERGY PULSE |
|---|---|---|
| LV1 | D1 | P1 |
| MV1 | D2 | P2 |
| HV1 | D3 | P3 |
| LV2 | D4 | P1 |
| MV2 | D5 | P2 |
| HV2 | D6 | P3 |
| LV3 | D7 | P1 |
| MV3 | D8 | P2 |
| HV3 | D9 | P3 |
| LV4 | D10 | P1 |
| MV4 | D11 | P2 |
| HV4 | D12 | P3 |

APPARATUS FOR SPACE SYNCHRONIZING CARRIER AND ROTATABLE PRINT DISK POSITIONS IN ON-THE-FLY PRINTING

BACKGROUND OF THE INVENTION

1. Field of the Invention

This invention relates to a movable disk printer and in one of its aspects to such a printer in which printing is provided while at least a movable carriage on which the movable disk is mounted is on-the-fly. More specifically, this invention relates to the synchronization of a movable disk which rotates for a variable distance with the carriage moving at a variable velocity so that the moving carriage reaches a selected print position coincident with the rotatable disk's arrival at the print character selected for said print position.

2. Description of Prior Art

Printers which utilize a rotating disk with characters on the periphery thereof are well known. Several of such printers are commercially available. Rotating disk printers can be divided in categories by either focusing on how the disk rotates or by focusing on how the carrier traverses.

Focusing on how the disk rotates, such printers can be divided into a first category where the disk constantly rotates and into a second category where the motion of the disk is intermittent. In printers with a constantly rotating disk, printing takes place when the hammer strikes the rotating disk. Rotation of the disk is not stopped each time a character is printed. In printers with a disk that intermittently rotates, the disk is rotated to the desired print position and then stopped. There is no disk rotation while printing takes place.

An alternate division of disk printers can be made by focusing upon the motion of the carrier. In some printers, the traverse of the carrier is stopped each time printing takes place. In other printers, the carrier is moving at the instant when printing occurs. In both the type where the carrier is moving when printing occurs and in the type where the carrier is stopped when printing occurs, the disk may or may not be rotating at the time of printing. In some printers where the carrier is moving at a fixed speed when printing takes place, the carrier is slowed down and stopped between print positions in order to give the rotating disk time to move to the desired character.

The following are some of the issued and pending patents which show rotating disk printers:

The Willcox U.S. Pat. No. 3,461,235 issued Aug. 12, 1969 shows a disk printer with a constantly rotating disk. The carrier stops at each print position.

The Ponzano U.S. Pat. No. 3,707,214, issued Dec. 26, 1972, discloses a disk printer which has separate controls for a print wheel and its carrier. The print wheel and the carrier move by the shortest distance at the next selected position. The print wheel and the carrier stop at each print position.

The Robinson U.S. Pat. No. 3,356,199, issued Dec. 5, 1967, describes a rotating disk printer wherein the disk is constantly rotating. The type elements on the disk are in a particular spiral configuration. The carrier also moves at a constant speed which is synchronized with the motion of the disk in such a manner that the desired character can be printed in each print position.

The Giani U.S. Pat. No. 3,742,845, issued July 3, 1973, shows in FIG. 11 a drum printer which has a constantly rotating drum. It is suggested that this drum could be mounted on a carrier. The carrier would have to stop at each print position in order to give the rotating drum time to rotate to the desired character.

The Cahill U.S. Pat. No. 3,794,150, issued Feb. 26, 1974, discloses a drum printer which includes an incrementing carrier. The carrier stops at each print position until the drum rotates to the desired position.

Application Ser. No. 535,647 of Jensen et al, filed Dec. 23, 1974, discloses a carrier control system for a start-stop disk printer in which the carrier normally traverses at a predetermined speed. Printing always occurs at the same predetermined speed; however, if there is not sufficient time to rotate the disk to the next desired character, the carrier is slowed down between print positions and then returned to the predetermined speed.

U.S. Pat. No. 4,030,591, Martin et al, issued June 21, 1977, discloses a rotating disc printer where the carrier is moving at a variety of velocities when the printing by the firing of the print hammer takes place. Thus, the firing of the print hammer must be timed dependent on the velocity of the carrier or carriage at the particular instance.

In U.S. Pat. No. 3,858,509, issued Jan. 7, 1975, a rotating disk printing apparatus is disclosed in which the striking force applied to the hammer can be varied between "light" and "hard". However, in that patent the printing is not done on-the-fly and there is no need to coordinate the speed of the carriage and the travel time of the print hammer to insure that the position of the character to be printed is at the print impact point at the time it is caused to strike the printing medium.

U.S. Pat. No. 4,035,781, L. H. Chang, issued July 12, 1977, mentions a procedure in a printer wherein upon a failure to print, at least one retry to print is made before the apparatus is stopped for an error correction routine. This patent does not involve on-the-fly printing wherein the carrier is never stopped. In the apparatus of the patent, the carrier appears to stop at each print position. Thus, it appears to be unrelated to the problem of synchronization of time related parameters in on-the-fly printers.

Further developments with rotating disk printers covered in a copending application Kane et al, Ser. No. 863,450 filed Dec. 22, 1977, the details of which are included in description of the embodiment of the present invention, relate to rotating disk printers in which the carrier is moving at a variety of velocities, the rotatable character disc is rotating over a variety of distances and the print hammer is driven at a variety of forces in order to achieve consistent and high print quality. Thus, the approach in the copending application adds a further element, i.e., variable hammer force which unlike the apparatus of U.S. Pat. No. 3,858,509 must be coordinated with a variable carriage velocity and variable disk rotation distance in order to achieve the desired synchronization of selected printed character with the selected carrier print position. Actually, as set forth in said copending application and hereinafter in the detailed description of the present application, the variations in impact force of the hammer are manifested by corresponding variations in hammer flight time. Thus, in order to achieve synchronization for printing a character, the apparatus depends on the synchronization of three time-related variables: the variable distance the character disk must rotate, the variable velocity of the carriage and the variable flight time of the hammer.

To a great extent the purpose of on-the-fly printing is meeting the ever-increasing demand in the printer field for higher and higher printing speeds, in excess of 50 characters per second and approaching 100 characters per second. However, in order for on-the-fly printing to operate at its maximum speed potential, it is necessary that the apparatus controls coordinate at least two time related variables into synchronization. Otherwise, printing errors will of course occur. Since the time related variables such as the time it takes for the rotating disk to go from one character to another or the time it takes for the carrier to move from a first to a second print position are subject to transient variations, it becomes increasingly difficult to increase the printing speeds of the printers and still remain within the allowable tolerances of such transient variations. Customarily, this is done by operating the apparatus at a rate within the timing tolerances of the slowest time related parameter to be coordinated. In the case of the high speed printer, this is usually the time required for the rotating character disk to rotate the distance from a given character to the next selected character. Printing does not take place until a period of time is permitted to elapse sufficient for the rotating disk to have reached the next selected character. However, this approach does impose a significant limitation on potential operating speeds, particularly since the rotating disk subject to transient variations requiring relatively large tolerances for the time required to carry out a particular step.

BRIEF DESCRIPTION OF PRESENT INVENTION

The present invention achieves higher printing speeds in on-the-fly printers by operating a rotating character disk or print wheel within time tolerances significantly narrower than those found to be necessary in the prior art for preventing errors due to a failure of coincidence between the carrier at the next print position and the rotating disk character selected for that print position. The present invention recognizes that by pushing these time tolerances beyond the accepted conventional limitations, a relatively small number of coincidence failures will occur. However, the present invention provides apparatus for correcting such coincidence failures while still operating the apparatus at a higher overall character-per-second speed than comparable apparatus operating within the wider time tolerances for the rotating disk within which such coincidence failures would not occur. In this connection, it is estimated that with the apparatus of the present invention it is possible to narrow the rotating disk time tolerances to such a point that coincidence failures in even up to 5% of the characters to be printed on a given page could occur and be corrected in less time than it would take to produce the same printed page with conventional printer apparatus having rotating disk time tolerances so wide that substantially no coincidence failures occur.

The present invention is directed to on-the-fly printing apparatus wherein carrier means movable at a variable velocity from a first print position on-the-fly past a second print position must be coordinated with character printing means, e.g., a rotatable disk, having a plurality of movable characters which are adapted to imprint upon the application of an impact force; the movable characters are controlled by character selection means which move these characters over a variable distance during the movement of the carrier means from a first selected character coincident with the carrier at the first print position to a second selected character coincident with the carrier at a second print position. The apparatus further includes control means for controlling movement of the carrier means and the character selection means into coincidence at a print position such as said second print position. Such control means further include means for detecting a coincidence failure at a selected print position and means responsive to a detected coincidence failure for reversing the movement of the carrier back towards the first or earlier print position while permitting the uninterrupted continued movement of the selection means toward said second selected carrier. In addition, the control means include means for reinitiating the forward movement of the carrier toward the second print position, and means for retaining the selected means at the second selected character until the arrival of the reinitiated carrier at the second print position. In this manner, coincidence will occur if the character selection means has reached said second character by the time reinitiated carrier has reached the second print position, and a hammer or other impact means may be actuated to print the character.

BRIEF DESCRIPTION OF THE DRAWINGS

Referring now to the drawings, wherein a preferred embodiment of this invention is illustrated, and wherein like reference numerals are used throughout to designate like parts;

FIG. 4 is a graph showing the various velocities utilized to move the carrier a certain distance in order to provide an example of carriage movement during printing;

FIG. 5 is a diagram illustrating the duration of certain delay periods and the print hammer control pulse widths utilized in this invention to control the printing hammer;

FIG. 6 is a chart showing the relationship between the various delays and pulse widths employed to obtain a desired printing impact force and a desired escapement velocity of the printing carriage;

DETAILED DESCRIPTION OF PREFERRED EMBODIMENT

Because the preferred embodiment of the present invention was directed to apparatus described in copending application Ser. No. 863,450, Kane et al, filed Dec. 22, 1977, related to on-the-fly printer apparatus having three time dependent variables; velocity of the carriage, distance moved by the rotating disk during character selection and impact hammer flight time, present description will be directed to implementing the on-the-fly-retry operations of the present invention by modifying the apparatus of said copending application. However, it should be understood that the operations and apparatus of the present invention are equally applicable to on-the-fly printer apparatus with hammers having a non-variable hammer impact. In the latter apparatus the on-the-fly-retry operations of the present invention are implemented with apparatus having only two time related variables: distance that the rotatable printer disk moves and velocity and the variable velocity of the carriage.

Figure 1:
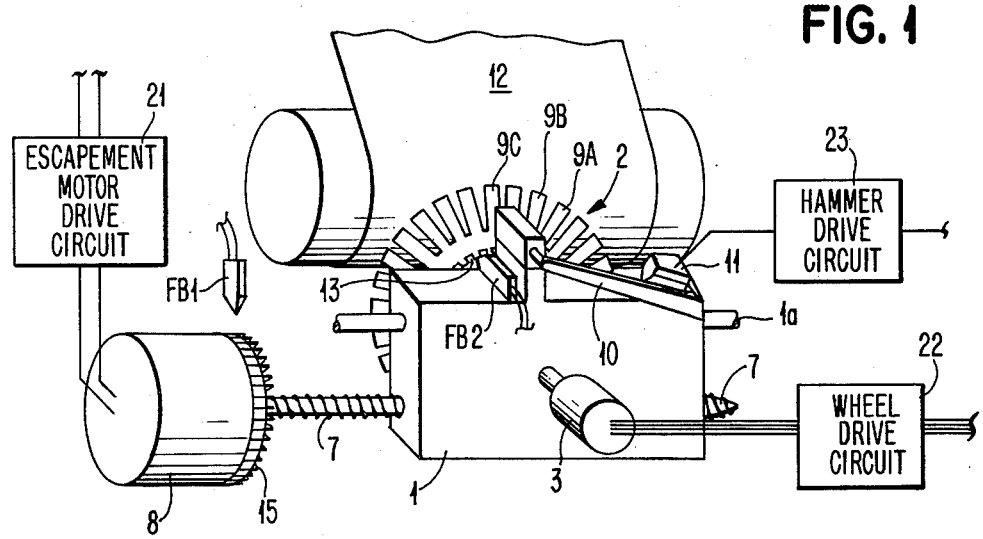
FIG. 1 shows a printer apparatus adapted for use with the present invention.

FIG. 1 shows the main mechanical components of the present printer. They are shown somewhat schematically since such components are well known and the present invention is directed to the control mechanism for the two stepper motors 3 and 8 and the print hammer 10, and not to the mechanical components per se.

As shown in FIG. 1, a laterally sliding carrier 1 is mounted on a guide rod 1a and a lead screw 7 and carries a rotatable print wheel or disk 2 driven by a stepping motor 3. The carrier 1 is driven by lead screw 7 which is driven by a stepping motor 8. Alternatively, motor 8 could drive a belt which in turn could drive carrier 1.

A type disk 2 comprises a disk having a number of movable type elements such as the flexible spokes or type fingers 9A, 9B, 9C, etc. Printing of any desired character is brought about by operating a print hammer 10, which is actuated by a solenoid 11, both of which are mounted on carrier 1. When the appropriate type finger approaches the print position, solenoid 11 actuates hammer 10 into contact with the selected type finger, driving it into contact with a paper 12 or other printing medium. An emitter wheel 13 attached to and rotating with type disk 2 cooperates with a sensor FB2 to produce a stream of emitter index pulses for controlling the operation of the printer. The emitter has a series of teeth each of which correspond to one finger 9A, 9B, 9C, etc. A homing pulse is generated for each revolution of the print wheel by a single tooth on another emitter (not shown). The printer controls can thus determine the angular position of type disk 2 at any time by counting the pulses received since the last homing pulse. A toothed emitter 15 is mounted on the shaft of the motor 8 and in conjunction with a sensor FB1 provides pulses which indicate the position of the carrier 1.

Stepper motors 3 and 8 are activated by conventional drive circuits 21 and 22. Examples of the type of drive circuitry that could be used are shown in U.S. Pat. No. 3,636,429. A hammer solenoid 11 is actuated by a hammer drive circuit 23 which is also conventional.

The actions of positioning the carrier 1 and positioning the print wheel 2 are, in general, independent except that coordination is required at the instant printing occurs. Both type disk 2 and carrier 1 must be in a selected position (but they need not be at rest) when hammer 10 strikes type disk 2.

Figure 2:
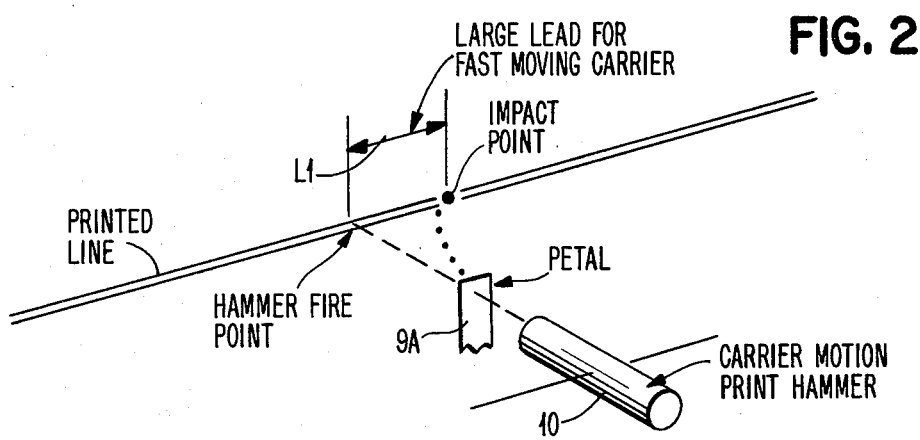
FIG. 2 is a diagrammatic view illustrating the relationship between the hammer firing point and the impact point when the carrier is moving at a relatively fast rate.
Figure 3:
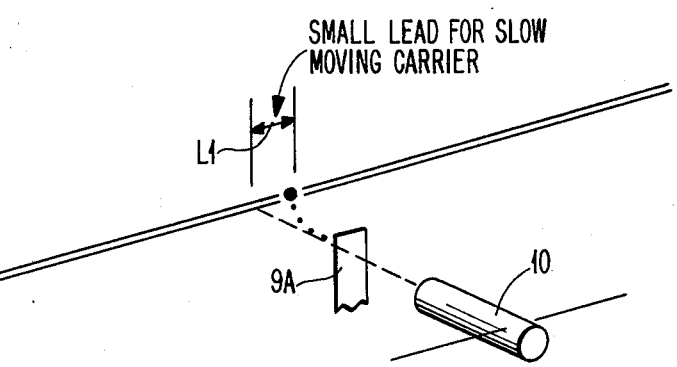
FIG. 3 is a view similar to FIG. 2 except that that carrier is moving at a relatively slow rate.

Referring now to FIG. 2 and 3, the relationship between the hammer firing point (at which time the firing of the print hammer is initiated), and the impact point on the printed line is illustrated. In the instance of FIG. 2, this relationship is illustrated when carrier 1 is moved at a relatively high velocity, whereas in FIG. 3 the same relationship is illustrated except that the carrier is being moved at a slower velocity. As illustrated in FIG. 2, a relatively large lead indicated by the arrow L1 is required for petal 9a to imprint on the printed line at the impact point, whereas in FIG. 3 the line L1 is relatively shorter. Thus, it is apparent that when the velocity of the carrier is changed that either the hammer firing point must be changed if the flight time of the print hammer is constant, or the hammer flight time must be also varied so that petal drive will impact the printing medium at the desired print point.

As set out in U.S. Pat. No. 4,030,591, the motion of the carrier can be chosen to move at a plurality of different velocities depending upon the character selection of the print wheel and, thus, the time required for the print wheel to move between adjacent characters. In that patent, four different velocities are utilized for the carriage and for purposes of illustrating this invention, the movement of carriage 1 will likewise be at a velocity chosen among four separate velocities, V1, V2, V3, and V4. For purposes of illustration of this invention, it is assumed that velocity V1 will be the slower of the velocities, velocity V2 faster than V1, velocity V3 faster than V2 and V1, and velocity V4 the fastest velocity. Thus, by selecting the fastest velocity at which the carrier can move for any selected change in position of print wheel 2 as it moves between successive characters (or spaces if such are in the sequence of characters to be printed), then the printing speed of the printer can be maximized. The present apparatus provides for actuation of the print hammer in coordination with the selected carrier velocity in order to insure that when different carrier velocities are selected, the print hammer will be fired at the appropriate time in order to permit the printing petal to strike the printing medium at the desired impact point.

As previously noted, a further important aspect of the present apparatus is the provision for variation in the striking force of the print hammer on the selected print wheel petal, in accordance with character selection, in order to improve the print quality of the apparatus. However, since variations in the striking force cause variations in the flight time of the petal from the point of impact by the hammer to the impact point to the printed line, it is further necessary to coordinate with the carriage velocity and hammer firing point with flight time of the petal for each different flight times (or striking forces) which may be selected.

In the case where the force causing print hammer 10 to strike the petal is constant, such as disclosed in U.S. Pat. No. 4,030,591, then it is only necessary to coordinate the firing point of the hammer with information concerning the carrier velocity in order to insure that the correct impact point will be struck under different character velocities. However, as set out herein, the impact force on the print hammer is a function of the width of the firing pulse, so that the width of this pulse can be varied to vary the flight time of the print hammer and petal. Thus, in use of this invention it is also necessary to coordinate this flight time information, or pulse width, with information concerning the carrier velocity and the time of initiation of the hammer firing sequence.

These relationships can be best understood by referring to FIGS. 4, 5, and 6. FIG. 4 illustrates a typical example of the excursion of carrier 1 at the four different velocities, V1, V2, V3, and V4, over a certain distance, which, in this instance, is approximately ½". In accordance with this apparatus, it is also desired to provide a plurality of firing pulse widths for the actuation of the print hammer such as pulse widths of the durations of P1, P2, and P3, as illustrated in FIG. 5. Further, in order to insure that when the hammer is fired by one of the three pulses of different widths (each respectively representing a different striking force) and when the carriage is moving one of the four different velocities, an appropriate delay is provided after initiation of the print hammer actuation cycle and until actual firing of the print hammer. Thus, for any combination of one of the four velocities of the carrier, and one of the three pulse widths for the firing pulse for the hammer, the impact or print point will always fall at the desired location. In FIG. 5 an example is given of the different delays that must be provided from the time that a hammer sync pulse is initiated at time $t_o$ to initiation of the hammer firing pulse FP1, FP2, or FP3 in order to provide printing at the time tp as illustrated. Three separate delay times D1, D2, and D3 are illustrated, and, in this example, since the carriage velocity is the same (V1), then the variations in the delay times of D1, D2 and D3 is dependent upon the width of each of the pulses P1, P2 and P3. In an example given, it is assumed that pulse P1 is of the shortest duration, pulse P2 of a duration longer than pulse P1, and pulse P3 of a duration longer than pulses P1 and P2, and each are respectively initiated at the firing times FP1, FP2, and FP3. Each of the pulses respectively terminates at some time te prior to print point time tp. Since pulse P3 drives print hammer 10 the hardest, the flight time of the hammer from time FP3 to TP is the shortest as is the time from the end of the pulse, te, to print point time tp. The flight time of the hammer when actuated by pulse P2 is correspondingly longer than that required for pulse P3, and the flight time of the print hammer when actuated by pulse P1 is the longest for the three pulse durations indicated. Thus, because of these different flight times, it is necessary in order to coordinate the print time of the petal being struck by the print hammer, to provide an appropriate delay time for each of the different striking forces that can be chosen for the print hammer and for each of the different velocities that can be chosen for carrier 1.

FIG. 6 illustrates a delay table which lists the different delay times that can be chosen for appropriate combination of chosen carrier motion velocity and print hammer striking force. As illustrated in FIG. 6, each of the hammer energy pulses P1, P2 and P3 can correspond to either light impact, medium impact, or hard impact, respectively, of the print hammer. Thus, for each of the four velocities of the carrier, V1, V2, V3 and V4, one of the three impact conditions, light, medium, or hard (as represented by pulses P1, P2 or P3) can be chosen. Since this means twelve velocity-print impact combinations are possible in the example given in FIG. 6, it is necessary to provide for twelve separate delay times D1 through D12 to coordinate the firing time and flight time of the print hammer with the velocity of the carrier. Thus, in the example illustrated herein, a suitable microprocessor utilized to control the motion of the carrier and the motion of the print wheel, and the actuation of the print hammer, can be programmed to provide an appropriate delay time D1 to D12 upon receipt of the hammer sync signal and upon receipt of information as to velocity of the carrier and the duration of the firing pulse chosen.

Figure 7:
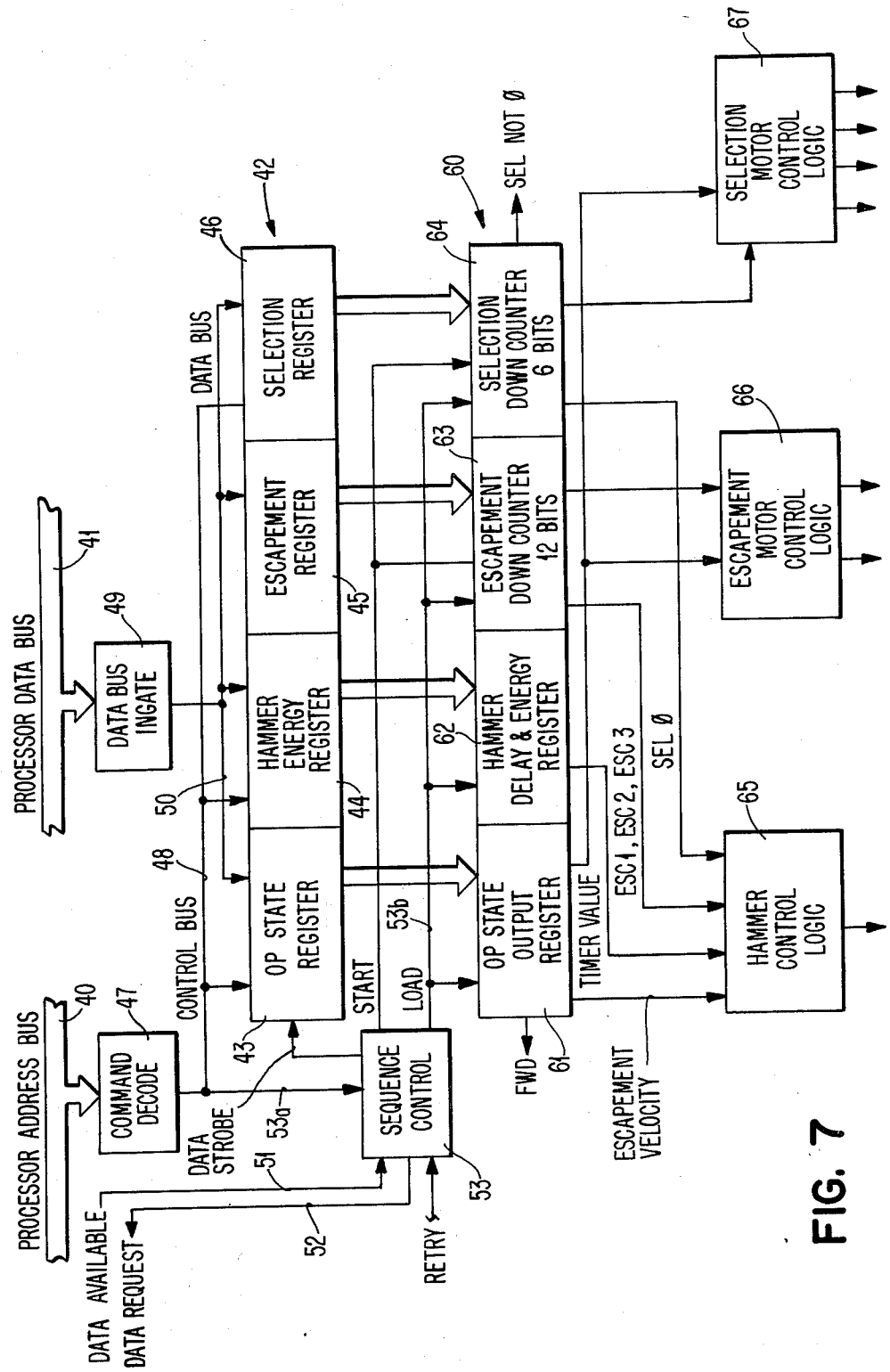
FIG. 7 is a schematic diagram, in block form, of the circuitry for controlling the operation of the motors moving the carriage and the printing disk, and of the circuitry controlling the firing of the print hammer.

Referring now to FIG. 7, a schematic diagram is illustrated of circuitry which may be utilized employing the principles of this invention discussed above in order to provide the appropriate control signals to drive circuit 21 (also referred herein as escapement motor drive circuit), to print wheel drive circuit 22, and to the hammer drive circuit 23. The data which is to be printed comes from a data source (not shown), which may be a conventional data buffer or keyboard input device such as a typewriter. Data from the data source is conducted to the input of a suitable computer or microprocessor, only the output of which is illustrated in FIG. 7, and the microprocessor can be any suitable commercially available microprocessor or computer such as the IBM System 7. The microprocessor receives the input data and will make certain calculations and then sends a series of binary numbers out on either an address bus 40 or a data bus 41 as illustrated in FIG. 7. In response to the data received from the microprocessor, the circuitry shown in FIG. 7 generates appropriate drive pulses to circuits 21, 22, and 23 in order to cause stepper motors 3 and 8 to move the carrier and the disk to the correct positions, and to activate the print hammer 10 in order to print the data supplied by the data source. The input signals to each of the drive circuits 21 and 22 include information indicating the direction which the stepper motor should move, and the number of steps to be moved, it being understood that one pulse is provided by the appropriate drive circuit for each step of the motors 3 and 8.

As illustrated in FIG. 7, the circuitry of this invention includes a plurality of buffer registers indicated generally by the reference numeral 42 which receive appropriate information from the microprocessor through address bus 40 and data bus 41. As illustrated in FIG. 7, buffer registers 42 include an operating state register 43, which controls the velocity of movement of carrier 1, a hammer energy register 44 which stores data concerning initiation time and duration of the hammer energy pulse and the delay times D1 to D12, an escapement register 45 which receives and stores data concerning the extent of movement of carrier 1, and a selection register 46 which receives and stores data from the microprocessor concerning the selection of the characters on the printing wheel 2. In order to load data into the buffer registers 42 from the microprocessors, address data from the microprocessor bus 40 is inputted into a command decode circuit 47 and from there through a control bus 48 to the respective buffer registers. Likewise, data from data bus 41 of the microprocessor is routed through a data bus in gate 49 and data bus 50 to the respective inputs of the buffer registers 42. The microprocessor is also connected through the control bus 48, a data available line 51, and a data request line 52 to a sequence control circuit 53 which controls the sequence of operation of the circuitry of FIG. 7 and of the microprocessor, as hereinafter explained. Since printing is accomplished by the present invention while carrier 1 is in motion, it is necessary to provide buffer registers 42 in order that data from the processor may be stored therein prior to actual usage, to permit the processor to accumulate subsequent data and to permit new data to be stored in the buffer registers when the previously stored data has been dumped. In this manner, the data is available to the operating registers in circuitry FIG. 7 described below when needed in order to permit the continuous operation of the system.

In addition to the buffer registers described, the circuit of FIG. 7 also includes a plurality of operating registers, illustrated generally by the reference numeral 60. In general, upon receipt of appropriate load command, operating registers 60 receive and store the information contained in the buffer registers 42, thus permitting the buffer registers to then intake new data while the data in the operating registers is being acted on. As illustrated in FIG. 7, an operating state output register 61 is provided to receive and store data from operating state register 43, a hammer delay and energy register 62 is provided to receive stored data received from hammer energy register 44, an escapement down counter is provided to receive and store data from escapement register 45, and a selection down counter 64 is provided to receive and store data from a selection register 46. The outputs of the respective registers are connected as shown in FIG. 7 to hammer control logic 65 for controlling the actuation of print hammer 10, to escapement control motor logic 66 for controlling the motion of carrier 1, and to selection motor control logic 67 for controlling the motion of print wheel 2.

In operation of the apparatus illustrated in FIG. 7, a control signal 53a from the microprocessor is conducted to sequence control circuit 53 and will cause sequence control circuit to start the sequence of operation of the printing apparatus of the invention. As each series of data from the microprocessor is acted on, sequence control circuit 53 will advise the microprocessor through line 52 that buffer registers 42 are ready to review the next bank of data. The data available response of the microprocessor on line 51 initiates a control sequence whereby a data strobe signal from sequence control circuit 53 arms the buffer registers 42 for receipt of new data from the microprocessor. The appropriate register is addressed by the microprocessor through control bus 48 and when the proper address is received by the individual registers, the data for that register is conducted through ingate 49 and data bus 50 to be stored in the register. Once this is accomplished, the sequence control circuit 53 provides a load control signal on line 53b which is conducted from sequence control 53 to each of the operating registers 60 to permit the data stored in buffer registers 42 to be dumped into the operating registers 60. Once this is accomplished, sequence control signal 53 will then request new data of the processor which would then function to provide the next series of the data to be stored in buffer registers 42. Of course, while this is being done, the data in operating registers can be acted on.

Figure 8:
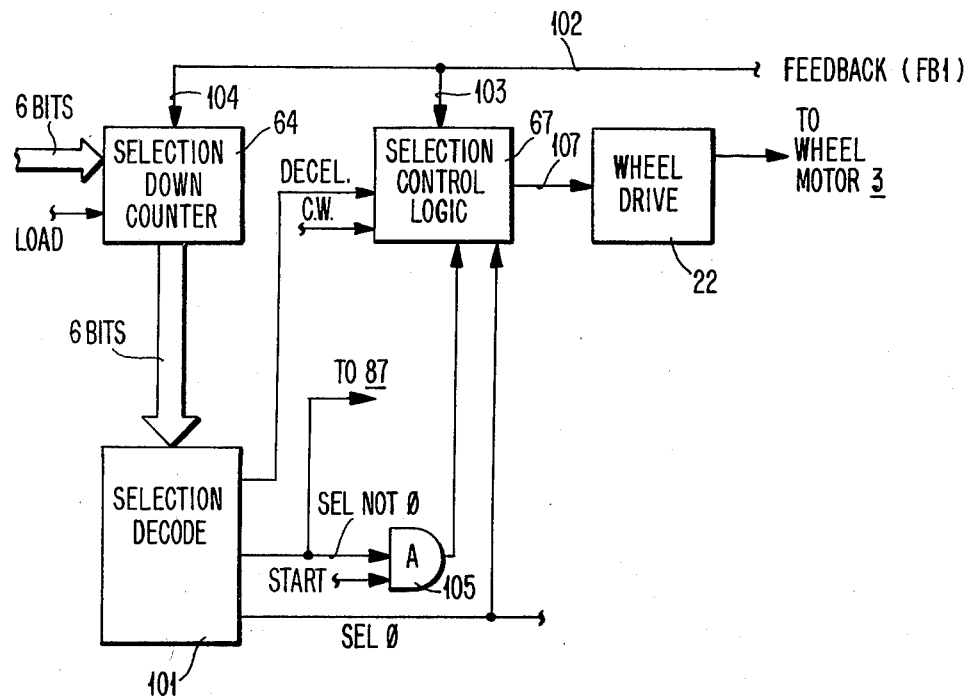
FIG. 8 is a more detailed schematic diagram, in block form, of the circuitry for controlling the character selection on the printing disk.
Figure 9:
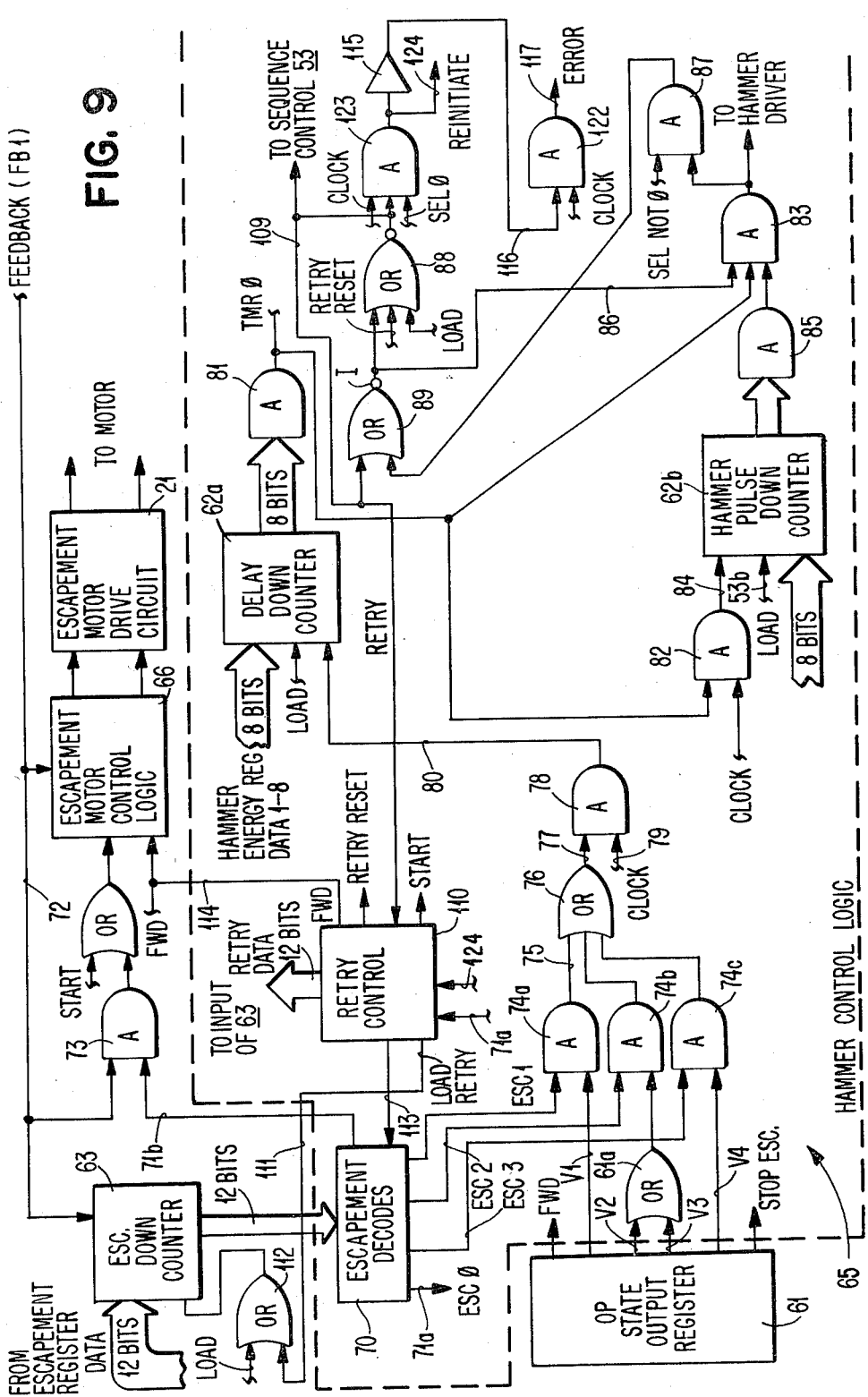
FIG. 9 is a more detailed schematic diagram, in block form, of the circuitry for controlling the firing of the printing hammer, controlling the escapement or movement of the carriage and for synchronizing these operations with the disk movement including the on-the-fly-retry operation in accordance with the present invention.

With reference to FIGS. 8 and 9, there will now be described the synchronization operations in accordance with the present invention. The details of the character selection control logic, are illustrated in FIG. 8 and the details of the control logic for the escapement motor and hammer driver, are illustrated in FIG. 9. An operation where the required synchronization between the escapement or carriage and the selection wheel occurs will first be described. This operation will be very similar to that described in the above mentioned copending application Ser. No. 863,450. Then an operation will be described wherein the required synchronization fails to occur and the on-the-fly-retry operation of the present invention is carried out.

With reference to FIG. 9, the escapement data stored in register 63 is conducted in a sequence of 12 bits to escapement decode cicuit 70 which provides three output signals ESC1, ESC2 and ESC3. These signals represent the number of units of movement that the carrier is away from escapement zero, with ESC1 being equal to one unit from zero, ESC2 being two units from zero, and ESC3 being three units from zero. The information from which these signals are derived can come from sensor FB1 through input line 72 and each unit can be any predetermined number of pulses from sensor FB1. Also, decode circuit 70 provides a fourth output at line 71a indicating that the escapement movement has reached zero point, and a fifth output which is indicated by line 71b and one which a signal is present when escapement has not reached zero. Thus, as long as line 71b is high and a signal is received on line 72 from position indicator FB1, then an AND circuit 73 will provide an output to escapement motor control logic 66 to provide for movement of the motor. This movement will continue as long as the NOT ESC ZERO signal on line 71b is high.

Since velocity V1 is the slow velocity of movement of carriage 1, the output signal ESC1 from escapement decode 70, which represents an escapement position one unit from zero, can be combined in an AND circuit 74a with velocity signal V1 from operating state output register 61, so that when the velocity of the escapement motor is at V1, and one unit from zero ESC1 has been reached, an output is provided on line 75 and conducted to OR circuit 76 which in turn provides an output 77 to an AND cicuit 78 which is under control of a clock pulse on line 79. In similar fashion, escapement unit ESC2 can be combined in an AND circuit 74b with signals from operating state output register 61 representing escapement velocities of either V2 or V3, (determined by OR circuit 61a) and escapement unit signal ESC3 can be combined in AND circuit 74c with escapement velocity signal V4. Thus, when any conditions are present which indicate that the carrier has arrived at one, two, or three units from zero in the escapement movement, at one of the velocities V1 to V4, AND gate 78 which is armed by clock signal 79 will provide a hammer sync pulse on line 80. This is the same pulse that is indicated by $t_o$ in FIG. 5 and is used to actuate the delay down counter 62a which has been previously loaded with data indicating the delay time required for the period of time from the hammer sync pulse to initiation of the firing pulse (FP1, FP2, or FP3). As indicated previously, with respect to the charts shown in FIG. 6, the information stored in the delay down counter 62a can be delay number from 1 to 12 indicating one of twelve possible delay periods, and this number is contained in eight bits of data received. Thus, as counter 62a counts down to zero, an output is provided through a circuit 81 (indicated as TMRO or time zero) and this output is conducted to the input of an AND circuit 82 and a second AND circuit 83 as illustrated in FIG. 9. AND circuit 82 is also armed by a clock pulse, and receipt of the signal TMRO from a circuit 81 will provide an output on line 84 which is conducted to the input of hammer pulse down counter 62b which determines the duration of the energy signal or pulse utilized to drive the hammer to actuation. As indicated, counter 62b has previously been loaded with information from register 44 contained in 8 bits concerning whether or not the pulse width is to be one of three pulses, P1, P2, or P3, as previously noted with respect to the discussion of FIGS. 5 and 6. The output of counter 62b is inverted so that as long as the counter is still counting, and its output has not reached zero, a signal is provided by AND gate 85 (referred to as HPC NOT ZERO) and this output is conducted to AND gate 83. Thus, as long as a pulse is provided to energize the print hammer as indicated by counter 62b being NOT ZERO, and the delay time has timed out as indicated by the output TMR ZERO from AND gate 81, then AND gate 83 is armed with these two signals. However, AND gate 83 requires a third input signal in order for the hammer to be actuated and it receives such on line 86. The absence of a signal on line 86 inhibits the firing of a hammer. Thus, by use of the inhibit circuit illustrated in the event that a petal has not been selected, then the hammer will be inhibited from striking the petal until it receives the next command that a petal has been selected.

The inhibit operation occurs as follows: The latch has been initially set to operative state by the load signal applied to OR gate 88. This initially sets a signal on line 86. Thus, when TMR ZERO and HPC NOT ZERO lines have signals, AND gate 83 will be turned on. In the event that the petal has not as yet been selected, i.e., the rotating disk has not reached the character selected for the next print position which the escapement or carriage had already reached, and thus the SELECT NOT ZERO signal to AND gate 87 is still on, a signal will be applied from gate 87 to OR gate 89, thereby turning the signal on line 86 off and AND gate 83 off before the hammer driver developes enough energy for a firing pulse. This aborts the firing pulse. At this point the retry operation of the present invention goes into effect.

However, before going into the on-the-fly-retry operation of the present invention, the operation of the selection down counter and selection control logic will be considered with reference to FIG. 8. As illustrated, the selection data stored in selection down counter 64 is conducted in a sequence of six bits to selection decode circuit 101 which provides two output signals either SELECT ZERO or SELECT NOT ZERO. The information from which these signals are derived can come from Sensor FB2 which tracks the position of the disk through input line 102. The feedback on line 102 advises the selection control logic 67 of the incremental movement of the wheel through input 103, and also signals the selection down count of 64 through input 104 of the wheel position. So long as SELECT ZERO has not been reached, the SELECT NOT ZERO signal will be applied through AND gate 105 on line 106 to the selection control logic which will continue to operate the wheel drive circuitry 22 through line 107 to drive the wheel motor 3 to rotate the wheel in the desired direction. The desired direction is determined by signal CW applied to the selection control logic 67 from the operating state output control register. A signal on CW indicates that the wheel is being rotated in the clockwise direction while the absence of a signal on CW indicates to the selection control logic that the wheel should be operated in a counterclockwise direction. Thus, so long as there is an indication of SELECT NOT ZERO to AND gate 105 coupled with the START input from sequence control 53, the selection control logic will continue to operate the wheel in the manner indicated.

As the wheel approaches SELECT ZERO i.e., at SELECT 1 or thereabout, the selection down counter will apply to the selection control logic via selection decode, a decel signal which will result in the wheel being decelerated. When SELECT ZERO is reached, the wheel will come to a brief stop. During normal operation, this should coincide with the application of signals to AND gate 83, FIG. 9, on the TMR ZERO line as well as the HPC NOT ZERO line. This will result in a signal being applied to one of the inputs of AND gate 87 as previously described coupled with the absence of a signal to AND gate 87 on the SELECT NOT ZERO line which is applied from output line 108 in FIG. 8. In the absence of this SELECT NOT ZERO signal to gate 87, there will be no inhibition of the pulse being applied through AND gate 83 to the hammer driver and printing will take place.

On the other hand, if the print wheel still has not reached SELECT ZERO by the time the escapement has reached the next print position as indicated by TMR ZERO and HPC NOT ZERO signals to AND gate 83, the SELECT NOT ZERO signal will continue to be applied to AND gate 87, FIG. 9, resulting in latch formed by OR gates 88 and 89 inhibiting any actuation of the hammer driver and initiating the retry sequence of the present invention by the output of a signal on line 109. This retry signal is applied to sequence control 53, FIG. 7, to prevent the sequence control from initiating any additional load data procedures from registers 42 or any start signal for the next cycle. Thus, the next print cycle is held up pending the outcome of the retry sequence. This same retry signal from line 109 also activates retry control 110 which takes over control of the operation from sequence control 53 which has been put into a nonoperative state.

Figure 10:
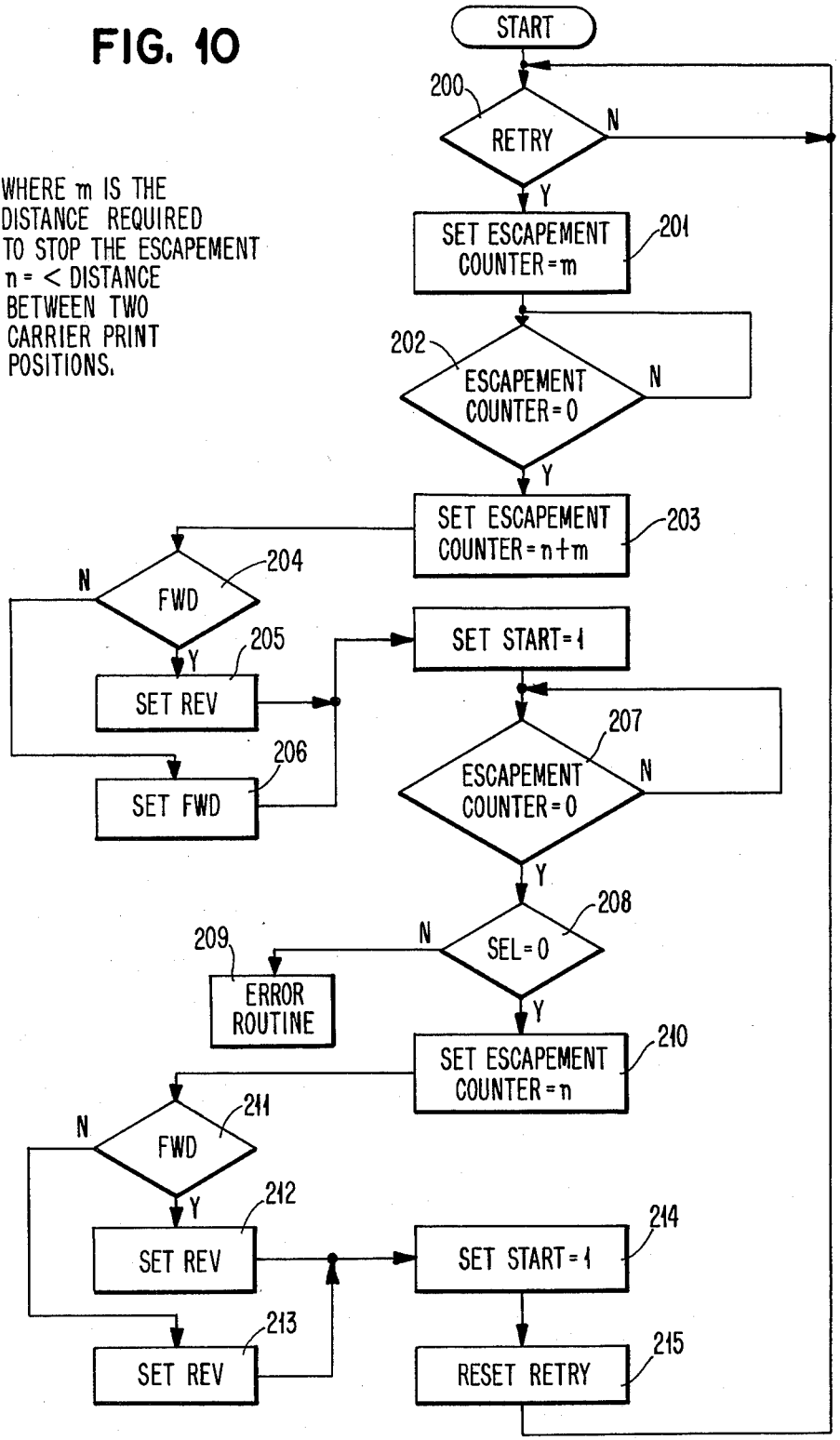
FIG. 10 is a flow chart depicting the sequence of operations carried out by the printer and particularly the circuitry of FIGS. 8 and 9 during an on-the-fly-retry upon a coincidence failure at a print position.

With reference to FIG. 10 which is a flow chart setting forth a sequence of operations during a retry sequence and FIG. 9, there will now be described the retry sequence. Whether there is a retry, block 200, FIG. 10, is determined by a signal on line 109, FIG. 9. If retry is yes, then, the escapement counter is set to a value equal to m, block 201. m represents the count necessary to bring the escapement to a halt. This is done under the retry control 110 which outputs a sequence of 12 bits stored therein indicative of the value of m to the 12 bit input of escapement down counter 63. This is done in coincidence with a load retry signal along line 111 which is applied to escapement down counter 63 through OR gate 112 through which the normal operation load signal from sequence control 53 may be applied during normal rather than retry operations. During this sequence when the escapement is being brought to a halt, the primary significant output from escapement decode 70 is the NOT ESCAPEMENT ZERO output to gate 73. In this respect the escapement motor control logic 66 and the escapement motor drive circuit 21 operate in the manner previously described with respect to normal operation.

During this sequence, it is unnecessary for the escapement to go through the decode to achieve outputs at ESC1, ESC2 and ESC3. The escapement down counter together with the escapement decode need only be operated in a stop mode, i.e., no velocity adjustments are necessary. Consequently, retry control logic provides a signal on line 113 to the escapement decode 70 wherein the decode operates in only the stop mode, i.e., it produces signals only on either the ESC ZERO line 71a or the ESC NOT ZERO line 71b. Thus, AND gates 74a, b, c, produce no signals and consequently, there is no hammer sync pulse and the hammer control logic will be inoperative during this halt cycle.

When the escapement counter reaches 0, block 202, FIG. 10, then there will be no signal on the NOT ESC ZERO input to AND gate 73 and the escapement motor drive will be halted. At this point, block 203, again under the control of retry control 110, another 12 bits will be loaded into escapement down counter 63 indicative of the value n+m where m has the previously stated meaning and n is a value which is less than the distance between two normal escapement or carrier print positions, i.e., the purpose of this value is to move the escapement in a reverse direction for a distance (m) equal to the sum of the overshoot or the distance required to halt the escapement (m) plus a distance (n) which is less than the distance between two carrier print positions, i.e., the escapement is backed-up but not quite to the previous print position.

Next, blocks 204, 205, and 206, FIG. 10, the direction of the escapement is reversed in order to effect the previously described backup. As indicated, the escapement which was proceeding in the forward direction it is set to proceed in the reverse direction, block 205. On the other hand if the escapement was not proceeding in a forward direction, it is now set to proceed in the forward direction, block, 206. In other words, in normal printing operation, the escapement may operate in either the forward or the reverse direction. For example, in many operations, escapement may print alternate lines in opposite directions for the maximum automated efficiency. Normally the direction of the escapement is determined by whether or not there is a signal on the FWD line to escapement motor control logic 66, FIG. 9. If there is a signal, the escapement normally proceeds in the forward direction and in the absence of the signal the escapement normally is moved in the reverse direction. Thus, during the retry, the determination is made in the retry control logic 110 as to the direction in which the escapement was moving and the appropriate signal or absence of signal applied to FWD line 114 which determines the direction of escapement backup. In the operation of this backup, the value m+n is loaded into the down counter as 12 bits of data which have also been stored in the retry control unit 110. The loading is triggered by a signal along line 111 through OR gate 112 to the down counter 63. Next, the backup is carried out in general as previously described, the signal still being applied to escapement decode 70 along line 113 so that the escapement will still function in the stop mode, i.e., ESC ZERO and NOT ESC ZERO will be the primary signal. When the escapement counter reaches ZERO, i.e., the escapement has been backed down the distance m+n, block 207 in FIG. 10, a determination is made, block 208, as to whether or not the select which has continued to operate in an uninterrupted state during this retry cycle has reached ZERO. If the select has still not reached ZERO, then the whole printing operation is terminated and the system calls the controlling microprocessor for the appropriate program in order to determine the nature of the error, block 209. On the other hand, if the select has finally reached ZERO, the initial forward movement of the escapement is reinitiated as will be described hereinafter.

The decision of SELECT EQUAL ZERO, block 208, is implemented as follows: the retry output from inverted OR gate 88 of the latch circuit along line 109 is also applied to AND gate 123. The SELECT ZERO signal from selection decode 101 in FIG. 8 is also applied to AND gate 123. The third input to AND gate 113 is a clock pulse which may be generated at a time during a retry cycle corresponding to the time when the backdown of the escapement is completed. The output from AND gate 123 is applied as a reinitiate signal along line 124 to the retry control. Thus, if select has finally reached 0 by the time the clock pulse is applied, a signal along line 124 will instruct the retry control to reinitiate the forward movement of the escapement motor. In addition, the output from AND gate 123 is also applied to inverter 115 which inverts the output of AND gate 123 and applies it as an input on line 116 to AND gate 122. The same clock signal which activates AND gate 123, also activates AND gate 122. Thus, if select has not reached ZERO, then there will be an error signal on out line 117 from AND gate 122 back to the controlling processor.

For purposes of this illustration, let us assume that SELECT ZERO has occurred and a reinitiate signal is sent to retry control 110 via line 124. The escapement counter is set to a value equal to n, block 210, FIG. 10, n being the distance that the backed up escapement is from the next print position. This is accomplished by an output of 12 data bits stored in the retry control to the escapement down counter 63 in the manner previously described for loading data into the escapement down counter. Then, blocks 211, 212, and 213, FIG. 10, a determination is made in the manner previously described with respect to block 204 through 206 as to the direction which the escapement should move in order to reach the next print position, i.e., to reverse the direction of the backed up escapement. The start signal is applied to the escapement, the operation in block 214, retry is reset, block 215. This is accomplished by a retry reset signal from retry control, FIG. 9, to OR gate 88 to free the latched circuit and still under the control of retry control 110, the escapement is moved past the next print position in the normal manner. There is no signal on line 113 to the escapement decode so that the escapement decode 70 operates in the normal manner to provide ESC1 to ESC3 signals as well as the ESC ZERO and NOT ESC ZERO signals. Since it has already been determined that the select has reached ZERO indicating that the print wheel or disk has reached the selected character for the next print position, the desired coincidence will occur and a normal printing of the selected character will take place at said next print position.

While the invention has been particularly shown and described with reference to a particular embodiment, it will be understood by those skilled in the art that various changes in form and detail may be made without departing from the spirit and scope of the invention.

What is claimed is:

1. A printing apparatus for on-the-fly printing comprising in combination:

carrier means movable at a variable velocity from a first print position past a second print position on a printing medium, printing means comprising a plurality of movable characters, each engagable with said printing medium, character selection means for moving said characters over a variable distance, during the movement of said carrier means, from a first selected character coincident with said carrier at said first print position to a second selected character coincident with said carrier at said second print position, means for urging said characters into engagement with said printing medium, and printing control means for controlling the movement of said carrier means and selection means into said coincidence at said second printing position and for actuating said urging means when said coincidence occurs, said control means including means for detecting a coincidence failure at said second print position, means responsive to a detected coincidence failure for reversing the movement of said carrier torward said first print position while permitting the continued movement of said selection means toward said second selected character, means for reinitiating the forward movement of said carrier toward said second print position and means for retaining the selection means at the second selected character until the arrival of the reinitiated carrier at said second print position, whereby said coincidence and actuation will occur if the selection means has reached said second character by the time the reinitiated carrier has reached the second print position.

2. The apparatus of claim 1 further including means for stopping said printing apparatus if the selection means has not reached said second character by the time the reinitiated carrier has reached the second print position.

3. The apparatus of claim 1 wherein said means for urging said characters into engagement are impact means.

4. The apparatus of claim 1 wherein said printing means are mounted on said carrier.

5. A printing apparatus for on-the-fly printing comprising in combination:

carrier means movable from a first print position past a second print position on a printing medium, printing means comprising a plurality of movable characters, each engagable with said printing medium, character selection means for moving said characters over a variable distance, during the movement of said carrier means, from a first selected character coincident with said carrier at said first print position to a second selected character coincident with said carrier at said second print position, means for urging said characters into engagement with said printing medium, and printing control means for controlling the movement of said carrier means and selection means into said coincidence at said second printing position and for actuating said urging means when said coincidence occurs, said control means including means for detecting a coincidence failure at said second print position, means responsive to a detected coincidence failure for reversing the movement of said carrier toward said first print position while permitting the continued movement of said selection means toward said second selected character, means for reinitiating the forward movement of said carrier toward said second print position and means for retaining the selection means at the second character until the arrival of the reinitiated carrier at said second print position, whereby said coincidence and actuation will occur if the selection means has reached said second character by the time the reinitiated carrier has reached the second print position.

6. A printing apparatus for on-the-fly printing comprising in combination:

carrier means movable at a variable velocity from a first print position past a second print position on a printing medium, printing means mounted on said carrier comprising a plurality of movable characters, each adapted to imprint said printing medium in response to an impact force, character selection means for moving said characters over a variable distance, during the movement of said carrier means, from a first selected character coincident with said carrier at said first print position to a second selected character coincident with said carrier at said second print position, impact means for applying said impact force to said characters, and printing control means for controlling the movement of said carrier means and selection means into said coincidence at said second printing position and for actuating said impact means when said coincidence occurs, said control means including means for detecting a coincidence failure at said second print position, means responsive to a detected coincidence failure for reversing the movement of said carrier toward said first print position while permitting the continued movement of said selection means toward said second selected character, means for reinitiating the forward movement of said carrier toward said second print position and means for retaining the selection means at the second selected character until the arrival of the reinitiated carrier at said second print position, whereby said coincidence and impact actuation will occur if the selection means has reached said second character by the time the reinitiated carrier has reached the second print position.

7. In a printer for printing at a plurality of print positions along a print line on a document the combination of, a carrier, a carrier drive means for moving said carrier across said print line from a first of said print positions past a second print position, a rotatable type element having a plurality of characters mounted on said carrier, a print hammer mounted on said carrier operable to impact said type element when a selected character is positioned at a print position, type element drive means for rotating said type element a variable distance from a first selected character coincident with said carrier at said first print position to a second selected character coincident with said carrier at said second print position, the length of time required to move between any two selected characters being dependent on the particular location of the particular characters on the type element, carrier speed determining means for generating a signal which is a function of the length of time required to rotate said type element from one selected character location to another selected character location, said carrier drive means including means responsive to said speed determining means for selectively driving said carrier from said first to said second print positions at a one of a plurality of different predetermined speeds selected to effect said coincidence at said second print position, means for actuating said print hammer upon said coincidence at said second print position, means for detecting a coincidence failure at said second print position, means responsive to a detected coincidence failure for reversing said carrier drive means to drive said carrier toward said first position while permitting the continued rotation of said type element toward said second selected character, means for reinitiating the forward movement of said carrier toward said second print position, and means for retaining said type element at said second selected character until the arrival of the reinitiated carrier at said second print position, whereby said coincidence and print hammer actuation will occur if the type element has reached said second character by the time the reinitiated carrier reached the second print position.

8. The printing apparatus of claim 7 wherein said means for actuating said hammer actuate the hammer at one of a plurality of impact forces, said actuating means being responsive to the speed of movement of said carrier and to the impact force of the hammer to cause the print hammer to strike the type element during the printing operation at a print position at a time which is dependent upon the speed of the carrier and the impact force of the print hammer.

9. The method of operating a printer, said printer comprising:

carrier means movable from a first print position past a second print position on a printing medium, printing means comprising a plurality of movable characters, each engagable with said printing medium, character selection means for moving said characters over a variable distance, during the movement of said carrier means, from a first selected character coincident with said carrier at said first print position to a second selected character coincident with said carrier at said second print position, means for urging said characters into engagement with said printing medium, and printing control means for controlling the movement of said carrier means and selection means into said coincidence at said second printing position and for actuating said urging means when said coincidence occurs, said method comprising the steps of:
  detecting a coincidence failure at said second print position,
  reversing the movement of said carrier toward said first print position upon the detection of a coincidence failure while permitting the continued movement of said selection means toward said second selected character,
  reinitiating the forward movement of said carrier toward said second print position and
  retaining the selection means at the second selected character until the arrival of the reinitiated carrier at said second print position,
whereby said coincidence and actuation will occur if the selection means has reached said second character by the time the reinitiated carrier has reached the second print position.

10. The method of claim 9 wherein said carrier means are movable at a variable velocity.

11. The method of claim 10 including the further step of stopping said printer if the selection means has not reached said second character by the time the reinitiated carrier has reached the second print position.

* * * * *